Feb. 26, 1963 R. P. KESSLER 3,079,065
CLOSURE FOR BAGS
Filed Oct. 17, 1960 2 Sheets-Sheet 1

INVENTOR.
RICHARD P. KESSLER
BY John H. Roberts
AGENT

Feb. 26, 1963  R. P. KESSLER  3,079,065
CLOSURE FOR BAGS
Filed Oct. 17, 1960  2 Sheets-Sheet 2
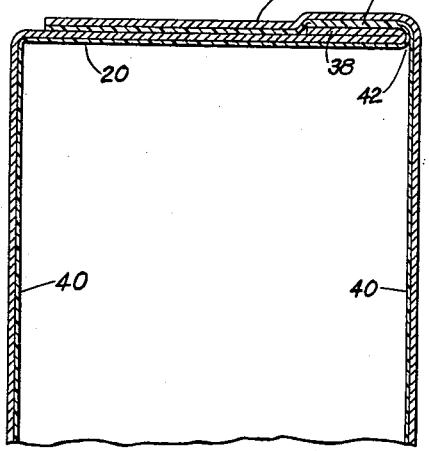
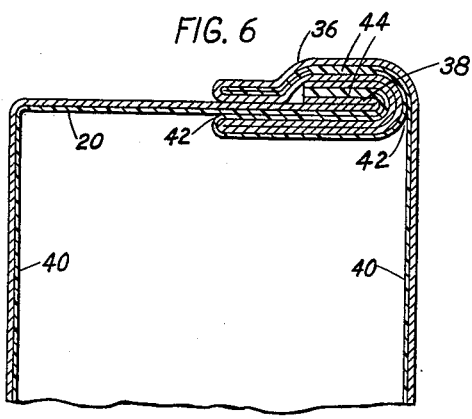
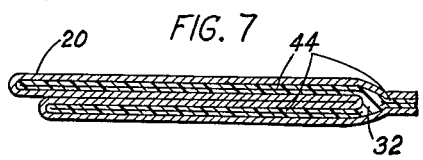
INVENTOR.
Richard P. Kessler
BY John H. Roberts
AGENT

United States Patent Office 3,079,065
Patented Feb. 26, 1963

3,079,065
CLOSURE FOR BAGS
Richard P. Kessler, Charleston, S.C., assignor to West Virginia Pulp and Paper Company, New York, N.Y., a corporation of Delaware
Filed Oct. 17, 1960, Ser. No. 63,158
2 Claims. (Cl. 229—57)

This invention relates to an improved closure for flat bottom bags having an inner surface composed of a heat sealable thermoplastic material.

The object of this invention is to provide a new type of sift proof closure for flat bottom bags which is extremely effective in preventing the loss of fluent materials. The effectiveness of this closure lies not only in the positive seal created between the inner surfaces of the bag which prevents the sifting of finely divided solid materials or the leakage of liquid materials but also in the manner in which the seal is protected against forces created during handling of the bags which may tend to cause rupture of the seal.

This invention is primarily applicable to multi-ply paper bags having an inner liner or coating of thermoplastic material, but it is also well adaptable to bags composed of a single ply of relatively thick thermoplastic alone. In general, it may be employed in any type bag which has an inner surface composed of a heat sealable thermoplastic material, whether the thermoplastic material is laminated to paper or other material or whether the thermoplastic material exists as a separate ply.

The method of preparing the sift proof closure of the present invention is illustrated in the accompanying drawings wherein:

FIGURE 5 is a section of the closure of this invention taken at section lines A—A in FIGURE 4.

FIGURE 6 is a section of the closure of this invention taken at section lines B—B in FIGURE 4.

FIGURE 7 is a section of the sealed portion of the closure of this invention taken along section lines C—C of FIGURE 3.

Figure 1:
FIGURE 1 is a view of an end of a formed tube of suitable material having an inner surface of a heat sealable thermoplastic material such as polyethylene, vinyl plastic or suitable wax impregnated paper.
Figure 2:
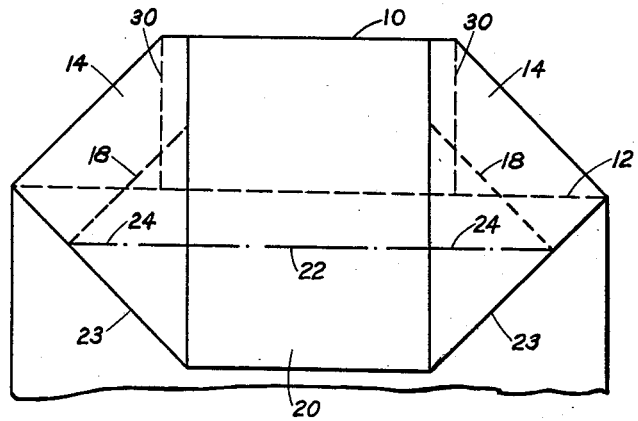
FIGURE 2 is a view of the end of the tube after the first folding step has been accomplished.
Figure 3:
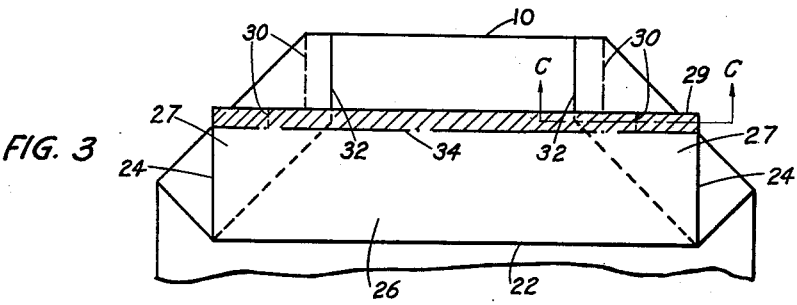
FIGURE 3 is a view of the end of the tube after the second folding step has been completed.

Referring to the drawings, a flat tube of suitable thermoplastic lined material is prepared with a notch 10 cut through the underlying wall of the tube as shown in FIGURE 1. In the first folding operation the upper wall of the tube is folded along line 12 flat back against the overlying wall of the tube as indicated in FIGURE 2 in a common bottoming operation. As a result of this folding operation the two inwardly folded end flaps 14 are formed which are triangular in shape except for the truncated corner created by notch 10. In the second folding operation the front header portion 20 of the tube is refolded along line 22 back upon the triangular end flaps 14. At the same time this fold is being made triangular portions of the end flaps 14 are folded back upon themselves along lines 18 which are substantially at 45° angles to line 22 and which intersect line 22 at the juncture of line 22 with the folded edges 23 of the front header 20. The end flaps 14 also are folded in this same step along lines 24 which substantially coincide with line 22 at which the front header is folded. The folds in the end flaps 14 at lines 24, however, are made in a direction opposite to the fold of the front header 20 along line 22. As a result of these folds the configuration shown in FIGURE 3 is obtained wherein a side flap 26 is formed having triangular folded corner portions 27 which consist of two walls of the tube folded in inner surface to inner surface relationship to one another. The folds in the end flaps along lines 24 form opposite edges of the side flap 26 which are substantially at right angles to line 22 at which the front header was folded to form side flap 26.

It will be noted from FIGURE 3 that any passage of material from the interior of the tube must occur across the shaded portion 29 of the tube. It will also be noted that all interior surfaces in this shaded area 29 between which material could pass are in face to face relationship with another interior surface of the tube. Since the interior surface of the tube is composed of thermoplastic material, all that is necessary to completely seal the tube is to heat seal the interior surfaces of the tube together continuously along the entire length of the shaded area 29. This may easily be accomplished by contacting the tube in the shaded area 29 on either or both sides of the tube with a heated bar or bars extending the entire length of side flap 26.

Figure 4:
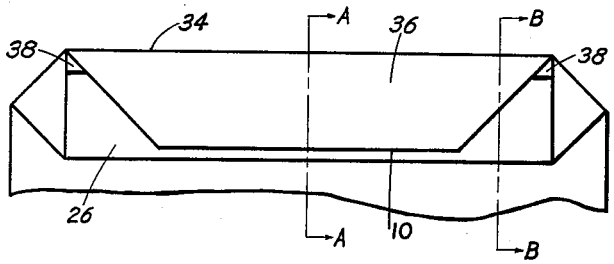
FIGURE 4 is a view of the finished sift proof closure of this invention.

After the tube has been heat sealed the back header portion is folded forward over side flap 26 along line 34 forming side flap 36 which is glued or pasted to side flap 26 thus completing the closure as shown in FIGURE 4. This final fold is made so that the outer edge portion 29 of side flap 26, which is heat sealed to itself and to the back header portion of the tube which upon folding forms side flap 36, is folded back upon itself beneath side flap 36 to produce tab 38. This refolding of the portion of side flap 26 which is heat sealed results not only in a flat bottom for the bag but also results in the heat seal being placed in the bottom of the bag when the closure is completed so that the seal is not subjected to disrupting forces during normal handling of the finished filled bag. Any internal forces created by the material in the bag will be directed against the bond between the side flap 26 and side flap 36 instead of against the seal. This fact will be easily seen in FIGURES 5 and 6. Where the material contained in the bag pushes against the opposite walls 40 of the bag any stresses set up against the closure will be directed so as to cause a shearing action on the glue or paste line holding side flap 26 to side flap 36. This will likewise be the case when the material in the bag is forced against the end of the bag. Consequently, there is very little if any forces directed against the sift proof seal of the bag and there are no requirements for external reinforcements of any kind which are generally necessary for other heat sealed bags.

It will be noticed in FIGURES 5 and 6 that all spaces 42 between the separate plies of the bag through which material could escape from the bag are effectively sealed by a fusion 44 of the thermoplastic inner surfaces of the bag whereby effectively preventing any siftage or leakage of material from the bag.

Where heavy multi ply paper tubes are being employed it is preferable that the outer ply or plies of the tube be step cut on the bottom of the tube as shown in FIGURES 1 and 2 by lines 30. As will be seen in FIGURES 3 and 7 the thickness of the tube at corners 32 where heat sealing is to occur is four times the thickness of a single wall of the tube. Consequently a great bulk of paper can be built up at these corners which may interfere with proper heat sealing. By step cutting the outer plies as at 30, the bulk at these corners will be materially reduced and a positive seal will be more easily produced.

I claim:

1. A flat bottom bag having a heat sealable inner surface which comprises a substantially rectangular side flap of greater width than the width of the bag bottom inwardly folded from one edge of the bag bottom and having an edge portion folded back upon itself along the opposite edge of the bag bottom and a second side flap folded over said rectangular flap, the opposing inner surfaces of the edge portion of the rectangular flap and of the second side flap being heat sealed together along a line between the edge of the rectangular flap and the line at which the second side flap is folded.

2. A flat bottom bag having a heat sealable inner surface which comprises inwardly folded end flaps, a substantially rectangular side flap formed by folding under said side flap triangular portions of the end flaps, and a second side flap folded over and attached to the rectangular side flap, said rectangular side flap being of a greater width than the width of the bag bottom and having an edge portion folded back upon itself along substantially the same line as that at which the second side flap is folded; the opposing inner surfaces of said edge portion of the rectangular side flap and the second side flap being heat sealed together between the line of fold at which the second side flap is folded and the edge of the rectangular flap.

References Cited in the file of this patent
UNITED STATES PATENTS

| | | |
|---|---|---|
| 2,360,720 | Robinson | Oct. 17, 1944 |
| 2,751,140 | Brady | June 19, 1956 |
| 2,956,724 | Owens | Oct. 18, 1960 |